Patented Nov. 15, 1932

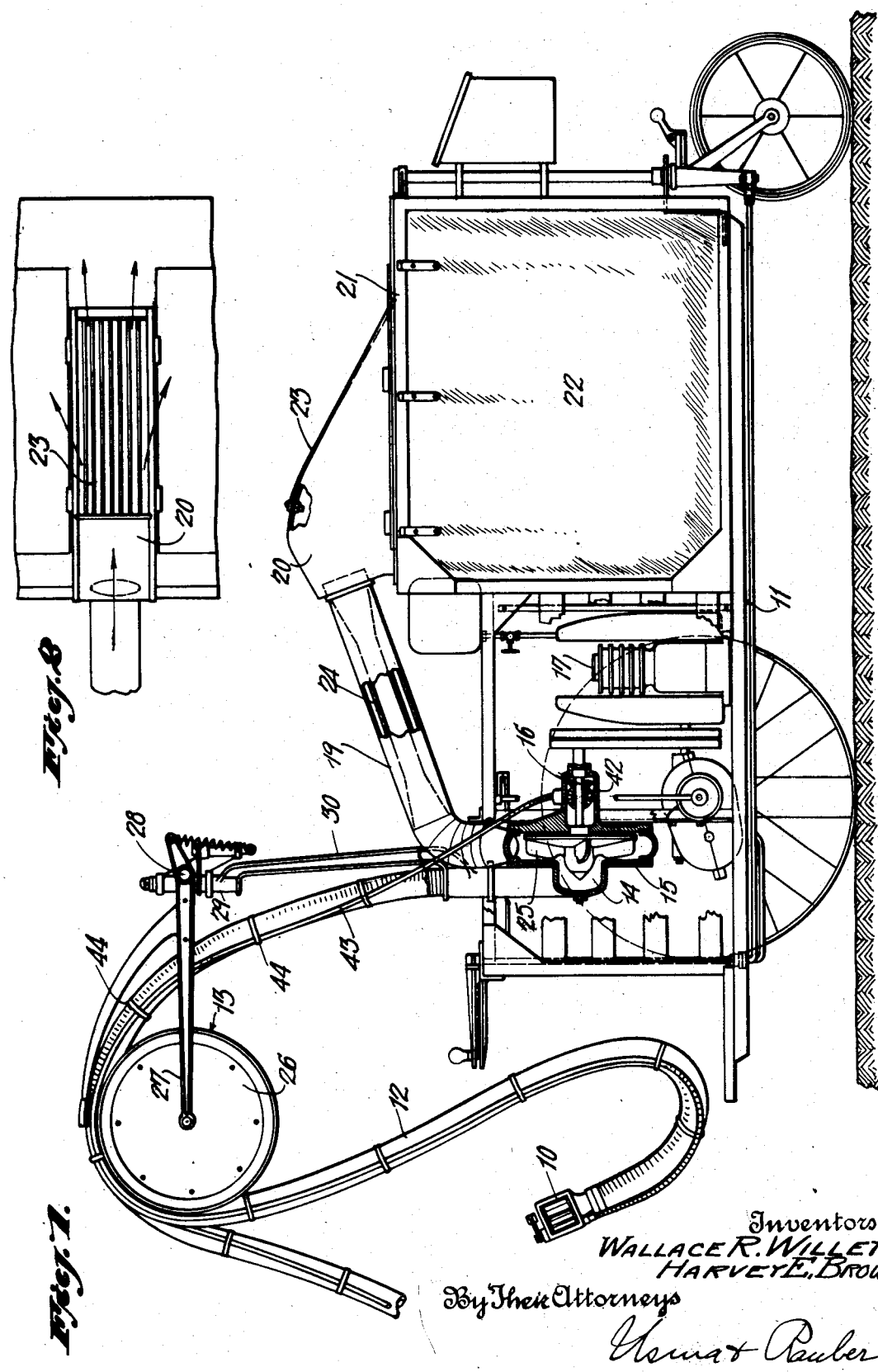

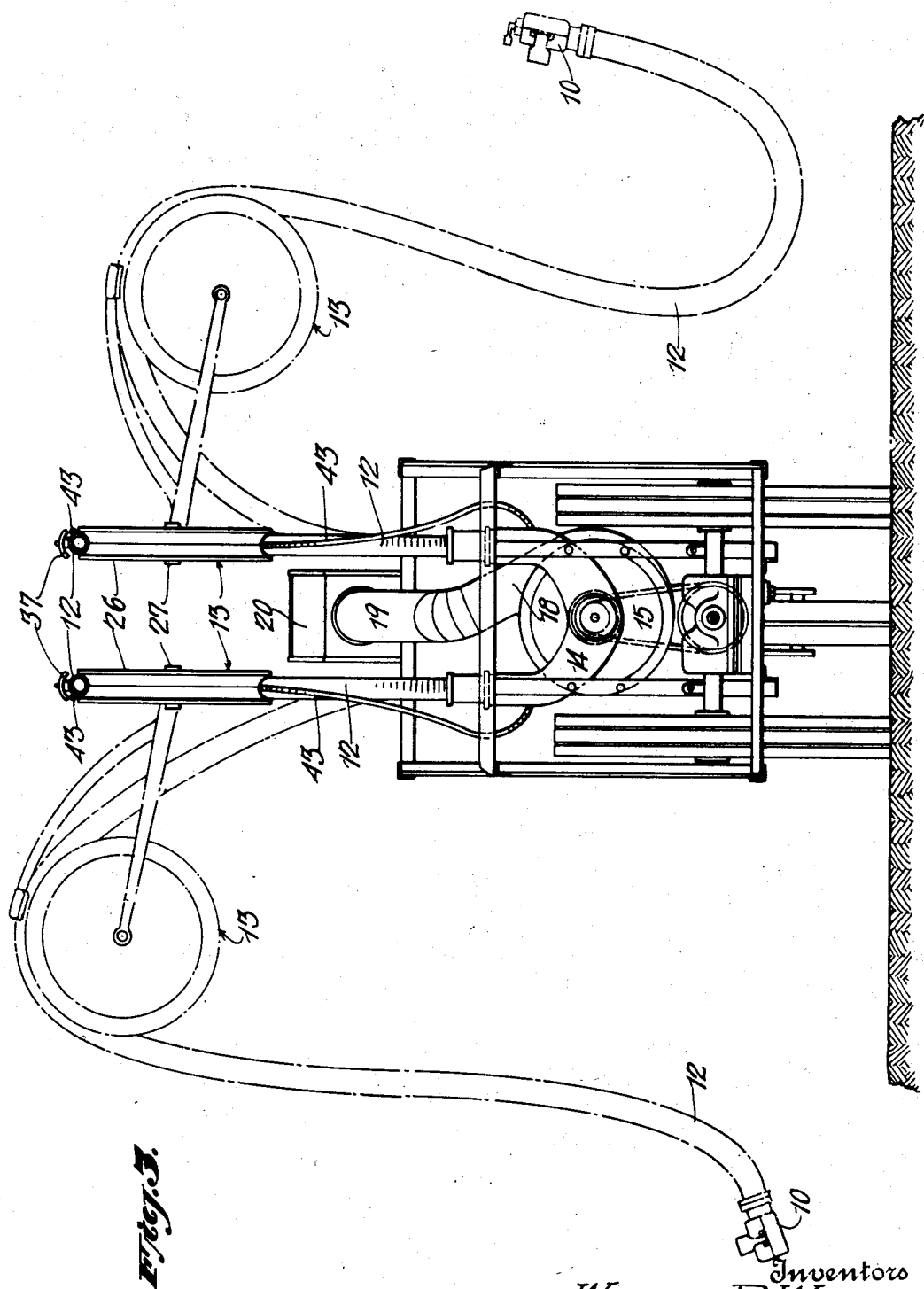

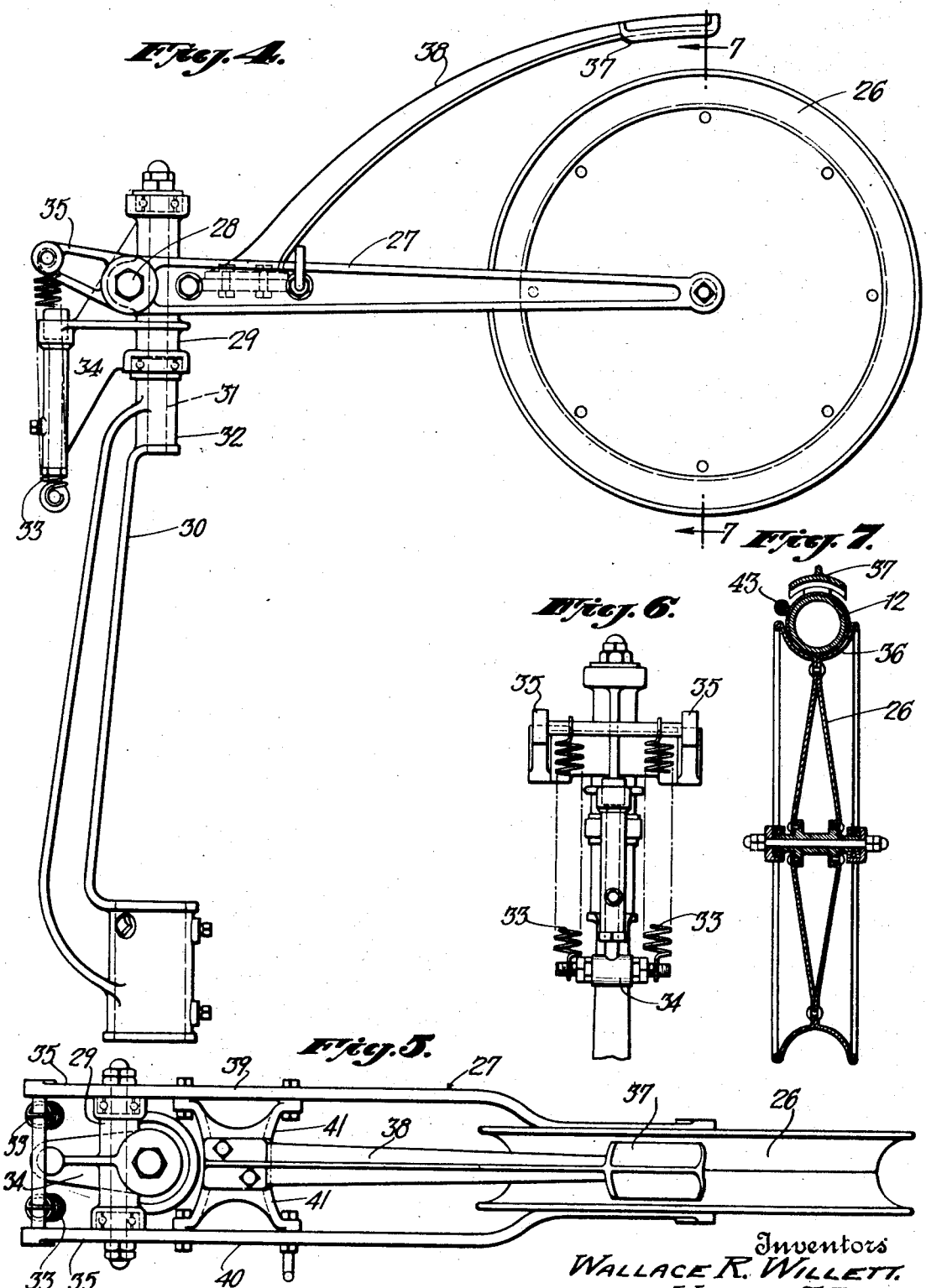

1,887,831

UNITED STATES PATENT OFFICE

WALLACE R. WILLETT, OF NEW YORK, N. Y., AND HARVEY E. BROWN, OF ST. LOUIS, MISSOURI, ASSIGNORS TO AMERICAN COTTON PICKER CORPORATION, OF ST. LOUIS, MISSOURI, A CORPORATION OF DELAWARE

COTTON PICKER MACHINE

Application filed October 10, 1930. Serial No. 487,658.

This invention relates to a cotton picker machine of the type in which the picker elements are brought manually into individual contact with the locks of cotton to be picked from the bolls and in which the detached locks of cotton fibers are conveyed directly from the picker element or picker head to a bag or receptacle.

An object of the invention is to provide conveyer means in which the picked locks of cotton have a smooth unrestricted path to the receiver bag or receptacle, and in which no opportunity is afforded for the stoppage of the locks and clogging of the conveyer.

Other objects of the invention are to provide means whereby dirt and moisture are largely removed from the cotton as it is delivered through the conveyer and the cotton is uniformly deposited in the receiver in a clean, dry condition; to provide a supporting means for the conveyer whereby the conveyer is so supported as to always provide an unobstructed passage without sharp turns and that permits the picker head or element to be freely and easily moved to any position and that does not impose any weight or resistance on the movement of the picker head and the conveyer connected thereto.

With these and other objects in view which will more fully appear from the following description, the invention comprises the cotton picker mechanisms described in the following specification and claims.

The various features of the invention are illustrated in the accompanying drawings, in which—

Fig. 1 is a vertical side view, parts being broken away, of a cotton picker machine embodying the preferred form of the invention.

Fig. 2 is a plan view of a portion of the conveyer receiving receptacle.

Fig. 3 is a front elevation of the cotton picker machine.

Fig. 4 is a detailed elevation of a supporting mechanism for the conveyer.

Fig. 5 is a plan view of the supporting structure shown in Fig. 4.

Fig. 6 is an elevation of a portion of the support taken from the left of Fig. 4, and Fig. 7 is a sectional view taken on line 7—7 of Fig. 4, of a supporting wheel forming part of the supporting mechanism and showing the position of a conveyer conduit thereon.

The conveying mechanism and the supporting structure of the present invention may be used with any suitable picker elements or picker head whereby the cotton locks may be detached from the bolls and placed in the inlet end of the conveyer. It is, however, shown by way of example as applied to picker heads 10 of the type shown and described in our co-pending application Serial No. 487,657. The mechanism may be mounted on any suitable support or vehicle for the cotton receiving bag or receptacle. It is preferably mounted on a self-propelled self-guided vehicle 11 having an automatic stopping and starting mechanism as described in our co-pending application Serial No. 487,659.

The conveyer mechanism comprises a flexible tube 12 connected at one end to the cotton picker elements and supported in a support indicated at 13 on the forward end of the vehicle 11. The end of the conveyer tube 12 opposite its connection to the picker elements 10 delivers to a central inlet 14 of a blower 15 mounted on the front end of the vehicle 11 and driven by means of a shaft 16 from an engine 17 which also serves to propel the vehicle 11.

In the embodiment of the invention illustrated in the accompanying drawings, two picker heads 10 and conveyers 12 are shown, both delivering to a single blower 15. This enables the vehicle 11 to be placed between two rows of cotton bushes and the cotton to be picked from both rows.

It will be understood, however, that the number of cotton picker elements and conveyers may be modified without departing from the broader features of the invention.

From the peripheral delivery end 18 of the blower 15 the cotton is forced by a draft of air through the pipe 19 into the forward end of a receiving chamber 20 mounted on the top plate 21 of the delivery bag or receptacle 22 and having a downward opening thereinto. The upper rear portion of the receiving chamber 20 is in the form of a grid 23 that slants upwardly and forwardly so that it intersects at its upper end the path of the cotton being blown through the pipe 19, and deflects the cotton into the receptacle 22. The interior of the pipe 19 is preferably provided with a venturi 24 to more effectively direct the locks of cotton against the inner side of the grid 23. As the cotton strikes the grid 23, any dirt or moisture contained therein is entirely or largely blown through the grid and thus separated from the cotton fibers which fall into the receptacle 22. The receiving chamber 20 is preferably mounted on the central axis of the top plate 21 so that the cotton falling downwardly to the central part of the receptacle 22 falls evenly on each side and fills the receiver uniformly. It will be understood that as the individual locks of cotton fibers are detached from the bolls by the picker head 10, they are sucked by the draft of air and drawn through the conveyer 12 by the blower 15 until they reach the inlet end 14 of the blower. Throughout this path it is essential to avoid any sharp bends that might catch and hold the locks of fibers and might thus clog the conveyer tube.

It is also important that the locks of fibers do not become cut and wound in the blower 15. For this purpose the fan 25 of the blower is supported in a shaft journalled only at the rear, leaving the front free, the cotton fibers thereby coming only into contact with the blades of the fan and are propelled outwardly and upwardly into the outlet 18 and thence to the tube 19 without an opportunity to be caught and held in any part of the mechanism.

In addition to providing a smooth, unobstructed path without sharp bends in the conveyer tube 12, the supporting mechanism of the conveyer conduit is so constructed and arranged that the picker head 10 and the parts of the conveyer tube 12 connected thereto may be swung to any position relative to the vehicle 11 and to any distance within the range of the machine without creating an undue or noticeable back pull on the picker head or the arm of the operator. For this purpose the flexible conveyer tube 12 is trained over and supported on a supporting and guide wheel 26 which is so supported that it may rotate on its axis and may be depressed by means of a slight downward pull, regaining its height upon a release of this pull, and may be swung in a direction about an upright axis, preferably a vertical axis.

In the embodiment of the invention shown in the drawings the wheel 26 is, therefore, mounted or journalled on the free end of a supporting arm or lever 27 which is fulcrumed on a horizontal pivot pin 28 mounted in a supporting piece 29 which is in turn mounted on the upper end of an upright 30 on the forward end of the vehicle 11. As shown in Fig. 3 there are two such supporting mechanisms, one for each of the flexible conveyer tubes 12. The supporting element 29 is provided with a downwardly projecting pin 31 that is received in a vertical socket 32 on to the upper end of the upright 30. With this construction the support 29 may swing freely about the vertical or upright axis of the pin 31 and socket 32. The arm 27 is resiliently held in its uppermost position by means of a pair of springs 33 that are connected at their opposite ends between a bracket 34 on the support 29 and extensions of the lever 27 that project through the opposite side of the lever 28.

When the picker head 10 is moved to such a position as to place a downward tension on the flexible conveyer 12, it serves to depress the wheel 26, tilting the lever 27 downwardly against the tension of the spring 33, the latter being of such resiliency as to create an upward thrust on the axis of the wheel 26 that just slightly overbalances the weight of the conveyer tube 12 so that upon release of the tension the wheel moves to its uppermost position.

It will be understood that as the wheel 26 is thus depressed, the effective length of the conveyer tube 12 is increased and that when the wheel 26 rises, any excess length of the flexible tube is thereby taken up.

When the picker head 10 is swung to one side so as to create a side pull on the wheel 26, the arm 27 swings outwardly to a greater or less extent, as shown in dotted lines in Fig. 3, and may at the same time be depressed to a greater or less extent. To prevent the conveyer tube 12 being pulled sidewise from the wheel 26 when a side pull is created, the rim 36 of the wheel 26 is made with a peripheral groove of the size to receive and fit the tube 12. A guard 37 is mounted above the rim 36 at the point where the tube 12 takes off, the guard 37 being curved to conform to the tube 12 and spaced slightly thereabove to avoid friction, but sufficiently close to engage the tube if it should tend to ride upwardly on one or the other of the edges of the curved periphery 36. The guard 37 is conveniently supported by means of an arm 38 mounted on the lever 27.

As shown in Fig. 5, the lever 27 is formed of two side members 39 and 40 spaced to receive the supporting member 29 and narrowed at their free ends to just receive the supporting wheel 26, and having a spanning plate 41 on which the end of the arm 38 is directly mounted. To decrease the weight and momentum of the wheel 26 to the lowest extent so that it will quickly respond to the lifting action of the spring 33 and downward, sidewise and rotational pulls of the flexible tube 12, the wheel is made of a spaced disc construction as shown in Fig. 7, and is preferably of aluminum or an aluminum alloy. Similarly, the supporting arms 27 and guard arm 38 are preferably made of aluminum and of skeleton construction.

Motive power for driving the picker head 20 may be taken from the drive shaft 16 by means of gears 42 which drive a flexible shaft 43 extending from the housing gears to the picker head 10. The flexible shaft 43 is enclosed within a suitable flexible casing and is tied to the flexible conveyer tube 12 by means of bands 44. The shaft is thus supported by the wheel 26 together with the conveyer tube 12, giving a unitary construction to the picker mechanism.

What we claim is:

1. In a cotton picker machine, a cotton receiver, a picker head, a conveyer tube having one end connected to said picker head and the other end delivering to said receiver, means for creating a current of air in said conveyer from said picker head to said receiver, an air outlet grid projecting upwardly of said receiver, and a venturi to project cotton from said conveyer tube at an angle against the lower side of said grid.

2. In a cotton picker machine, a cotton receiver, a picker head, a flexible conveyer tube having one end connected to said picker head and the other end delivering to said receiver, means for creating a current of air in said conveyer tube from said picker head to said receiver, a rotatable supporting wheel for said flexible tube said tube being trained over said wheel, and means for resiliently supporting said wheel with an upward pressure slightly exceeding the weight of said conveyer tube.

3. In a cotton picker machine, a cotton receiver, a picker head, a flexible conveyer tube having one end connected to said picker head and the other end delivering to said receiver, means for creating a current of air in said conveyer from said picker head to said receiver, a supporting wheel for said flexible conveyer tube said tube being trained over said wheel, and means for resiliently supporting said wheel in a vertical direction and for permitting said wheel to swing about an upright axis.

4. In a cotton picker machine, a cotton receiver, a picker head, a conveyer tube having one end connected to said picker head and the other end delivering to said receiver, means for creating a current of air in said conveyer tube from said picker head to said receiver, a supporting wheel for said conveyer, said supporting wheel having a transversely curved periphery in which said conveyer is received and supported, and a guard closely spaced from the conveyer tube in said curved periphery.

5. In a cotton picker machine, a picker head, a cotton receiver, a flexible conveyer between said picker head and said receiver, a wheel on which said flexible conveyer is received and supported, and means for supporting said wheel with a yielding pressure sufficient to support the weight of said conveyer.

6. In a cotton picker machine, a picker head, a cotton receiver, a flexible conveyer tube between said picker head and said receiver, a flexible driving shaft for said picker head mounted on said conveyer tube, a wheel on which said flexible conveyer is received and supported, and means for supporting said wheel with a yielding pressure sufficient to support the weight of said conveyer and said flexible driving shaft.

7. In a cotton picker machine, a picker head, a cotton receiver, a flexible conveyer tube between said picker head and said receiver, a wheel on which said flexible conveyer is received and supported, and supporting means for said wheel to permit said wheel to rotate and to swing in any direction about an upright axis.

8. In a cotton picker machine, a picker head, a cotton receiver, a flexible conveyer tube between said picker head and said receiver, a rotatable wheel on which said flexible conveyer is received and supported, means for supporting said wheel with a yielding pressure sufficient to support the weight of said conveyer, and means for permitting said support and wheel to swing about an upright axis.

9. In a cotton picker machine, having a cotton receiver, a picker head and a flexible tube between said picker head and said cotton receiver and supporting means comprising a fulcrumed supporting arm, a rotatable wheel on said supporting arm and having a transversely curved periphery on which said flexible conveyer is received and supported, and means for balancing the weight of said arm, said wheel and said conveyer.

10. A cotton picker machine which comprises a cotton receiver, a picker head, a flexible conveyer tube between said picker head and said receiver, a supporting wheel having a transversely curved periphery on which said flexible conveyer tube is received and supported, an arm for said wheel fulcrumed on a horizontal axis, and a support for said arm pivoted about an upright axis.

11. In a cotton picker machine, a cotton receiver, a picker head, a flexible tube between said picker head and said cotton receiver, supporting means comprising a fulcrumed supporting arm, a rotatable wheel on said supporting arm and having a transversely curved periphery on which said flexible conveyer is received and supported, and a spring for balancing the weight of said arm, said wheel and said conveyer.

12. In a cotton picker machine, a cotton receiver, a picker head, a flexible conveyer tube between said picker head and said receiver, an upright, a fulcrum vertically pivoted on said upright, an arm fulcrumed on said fulcrum, a spring for maintaining said arm against a downward weight, and a peripherally grooved wheel on said arm on which said flexible conveyer tube is received and supported.

13. In a cotton picker machine, a cotton receiver, a picker head, a flexible conveyer tube between said picker head and said receiver, an upright, a fulcrum vertically pivoted on said upright, an arm fulcrumed on said fulcrum, a spring for maintaining said arm against a downward weight, a peripherally grooved wheel on said arm on which said flexible conveyer tube is received and supported, and a guard on said arm extending over said wheel.

In testimony whereof, we have hereunto signed our names.

WALLACE R. WILLETT.
HARVEY E. BROWN.